US012673634B2

(12) United States Patent
Schmid et al.

(10) Patent No.: US 12,673,634 B2
(45) Date of Patent: Jul. 7, 2026

(54) AIRBAG FOR A DRIVER'S SEAT OF A VEHICLE AND AIRBAG MODULE, VEHICLE OCCUPANT SAFETY SYSTEM AND VEHICLE HAVING SUCH AN AIRBAG

(71) Applicants: ZF AUTOMOTIVE GERMANY GMBH, Alfdorf (DE); ZF AUTOMOTIVE SYSTEMS POLAND SP.Z.O.O., Czestochowa (PL)

(72) Inventors: Simon Schmid, Heuchlingen (DE); Pawel Malczak, Czestochowa (PL); Hidehisa Takada, Tokyo (JP)

(73) Assignees: ZF AUTOMOTIVE GERMANY GMBH, Aldorf (DE); ZF AUTOMOTIVE SYSTEMS POLAND SP .Z.O.O., Czestochowa (PL)

( * ) Notice: Subject to any disclaimer, the term of this patent is extended or adjusted under 35 U.S.C. 154(b) by 0 days.

(21) Appl. No.: 18/838,090

(22) PCT Filed: Feb. 13, 2023

(86) PCT No.: PCT/EP2023/053455
§ 371 (c)(1),
(2) Date: Aug. 13, 2024

(87) PCT Pub. No.: WO2023/152360
PCT Pub. Date: Aug. 17, 2023

(65) Prior Publication Data
US 2025/0196797 A1     Jun. 19, 2025

(30) Foreign Application Priority Data
Feb. 14, 2022    (EP) ..................................... 22156660

(51) Int. Cl.
*B60R 21/2338*        (2011.01)
*B60R 21/205*         (2011.01)
(Continued)

(52) U.S. Cl.
CPC ........ *B60R 21/2338* (2013.01); *B60R 21/205* (2013.01); *B60R 21/231* (2013.01);
(Continued)

(58) Field of Classification Search
CPC . B60R 21/2338; B60R 21/205; B60R 21/235; B60R 21/231; B60R 21/206;
(Continued)

(56) References Cited

U.S. PATENT DOCUMENTS 4,181,325 A * 1/1980 Barnett ................. B60R 21/239
280/739
5,454,594 A * 10/1995 Krickl ................... B60R 21/231
280/743.1
(Continued)

FOREIGN PATENT DOCUMENTS

CN          203651698 U  *  6/2014
CN          113276797 A      8/2018
(Continued)

OTHER PUBLICATIONS

International Search Report for International Application No. PCT/ EP2023/053455, with a mailing date of Apr. 3, 2023, 4 pages.

*Primary Examiner* — Keith J Frisby
(74) *Attorney, Agent, or Firm* — Tarolli, Sundheim, Covell & Tummino LLP

(57)          ABSTRACT

The invention relates to an airbag (100) for a vehicle seat of a, specifically multi-track, vehicle comprising a lateral fabric panel (10) and a main fabric panel (20) the edges (11, 21) of which are sewn up to each other so that an airbag volume is formed, wherein the lateral fabric panel (10) includes
two wing portions (13) each forming a sidewall of the airbag (100), and
a central portion (14) connecting the wing portions (13), and (Continued)

wherein the main fabric panel (20)

includes an upper portion (25) and a lower portion (24) which are sewn up with the wing portions (13) and are interconnected by a front portion (23), and in the lower portion (24) at least one flap (26) having an additional fabric strip (30) or a gathering seam (62) is provided, and wherein at least one tether (40) extending across the airbag volume is connected, on the one hand, to the upper portion (25) and, on the other hand, to the flap (26) or the gathering seam (62) to form, in the filled state of the airbag (100), a concavity (45) for bypassing a constraining contour.

14 Claims, 3 Drawing Sheets

(51) Int. Cl.
    *B60R 21/231*     (2011.01)
    *B60R 21/235*     (2006.01)

(52) U.S. Cl.
    CPC .. *B60R 21/235* (2013.01); *B60R 2021/23382* (2013.01); *B60R 2021/23509* (2013.01); *B60R 2021/23538* (2013.01); *B60R 2021/23576* (2013.01)

(58) Field of Classification Search
    CPC .......... B60R 2021/23382; B60R 2021/23509; B60R 2021/23538; B60R 2021/23576
    USPC .................................. 280/732, 743.1, 743.2
    See application file for complete search history.

(56) References Cited

U.S. PATENT DOCUMENTS

| | | | | |
|---|---|---|---|---|
| 5,558,300 | A * | 9/1996 | Kalberer | B60R 21/09 244/121 |
| 10,202,094 | B2 * | 2/2019 | Wang | B60R 21/205 |
| 10,688,952 | B2 * | 6/2020 | Heurlin | B60R 21/235 |
| 10,926,734 | B2 * | 2/2021 | Yamada | B60R 21/233 |
| 10,953,837 | B2 * | 3/2021 | Arima | B60R 21/233 |
| 11,242,027 | B2 * | 2/2022 | Munoz Melgar | B60R 21/2338 |
| 11,623,603 | B2 * | 4/2023 | Zhou | B60R 21/232 280/730.1 |
| 11,697,386 | B1 * | 7/2023 | Gould | B60R 21/231 280/728.3 |
| 11,724,663 | B2 * | 8/2023 | Gould | B60R 21/2338 280/731 |
| 11,865,995 | B2 * | 1/2024 | Aranzulla | B60R 21/205 |
| 11,878,647 | B2 * | 1/2024 | Jayakar | B60R 21/203 |

| | | | | |
|---|---|---|---|---|
| 2002/0063416 | A1 * | 5/2002 | Kamaiji | B60R 21/231 280/743.1 |
| 2005/0275201 | A1 * | 12/2005 | Schneider | B60R 21/231 280/731 |
| 2006/0163848 | A1 * | 7/2006 | Abe | B60R 21/231 280/729 |
| 2006/0232050 | A1 * | 10/2006 | Kumagai | B60R 21/231 280/732 |
| 2007/0126217 | A1 * | 6/2007 | Nayef | B60R 21/205 280/730.2 |
| 2008/0143086 | A1 * | 6/2008 | Higuchi | B60R 21/2346 280/736 |
| 2009/0250912 | A1 * | 10/2009 | Libby | B60R 21/2338 280/743.2 |
| 2010/0230940 | A1 * | 9/2010 | Hellot | B60R 21/231 280/732 |
| 2012/0013106 | A1 * | 1/2012 | Sato | B60R 21/205 280/729 |
| 2014/0339798 | A1 * | 11/2014 | Motomochi | B60R 21/205 280/732 |
| 2015/0367802 | A1 * | 12/2015 | Fukawatase | B60R 21/205 280/732 |
| 2018/0154856 | A1 * | 6/2018 | Yamada | B60R 21/231 |
| 2018/0222431 | A1 | 8/2018 | Nakanishi | |
| 2019/0077357 | A1 * | 3/2019 | Rupp | B60R 21/233 |
| 2019/0161044 | A1 * | 5/2019 | Schneider | B60R 21/233 |
| 2019/0381962 | A1 * | 12/2019 | Sheldon | B60R 21/205 |
| 2021/0046893 | A1 * | 2/2021 | Rosenberg | B60R 21/013 |
| 2021/0122317 | A1 * | 4/2021 | Fischer | B60R 21/205 |
| 2022/0185218 | A1 * | 6/2022 | Deng | B60R 21/233 |

FOREIGN PATENT DOCUMENTS

| | | | | | |
|---|---|---|---|---|---|
| CN | 212500257 | U | * | 2/2021 | B60R 21/205 |
| DE | 2251493 | A1 | * | 5/1973 | |
| DE | 19860804 | A1 | * | 7/2000 | B60R 21/2032 |
| DE | 202006001826 | U1 | | 5/2006 | |
| DE | 102006056919 | A1 | * | 6/2008 | B60R 21/231 |
| DE | 102012011664 | A1 | * | 12/2012 | B60R 21/205 |
| DE | 102012023928 | A1 | * | 6/2014 | B60R 21/231 |
| DE | 102016219071 | A1 | * | 4/2018 | |
| DE | 102018001991 | A1 | * | 9/2018 | |
| JP | H07156687 | A | * | 6/1995 | |
| JP | H0911837 | A | * | 1/1997 | |
| JP | 2003040066 | A | * | 2/2003 | |
| JP | 2005193806 | A | * | 7/2005 | |
| JP | 2007131056 | A | * | 5/2007 | |
| JP | 2007145146 | A | * | 6/2007 | |
| JP | 2011037398 | A | * | 2/2011 | B60R 21/231 |
| JP | 2020093756 | A | * | 6/2020 | |
| JP | 2020142607 | A | * | 9/2020 | |
| KR | 19980048845 | U | * | 10/1998 | |
| KR | 20050101403 | A | * | 10/2005 | |
| KR | 20150130843 | A | | 11/2015 | |
| WO | WO-8900528 | A | * | 1/1989 | B60R 1/00 |
| WO | WO-2018173161 | A1 | * | 9/2018 | B60R 21/203 |

* cited by examiner

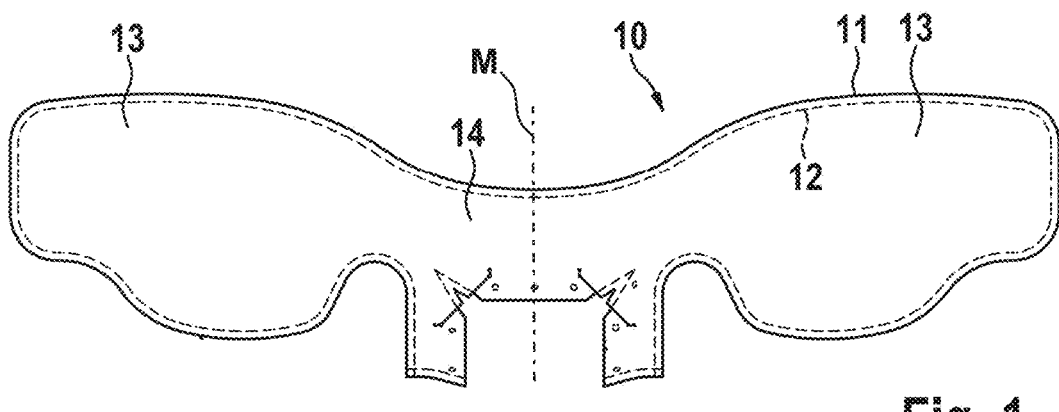
Fig. 1
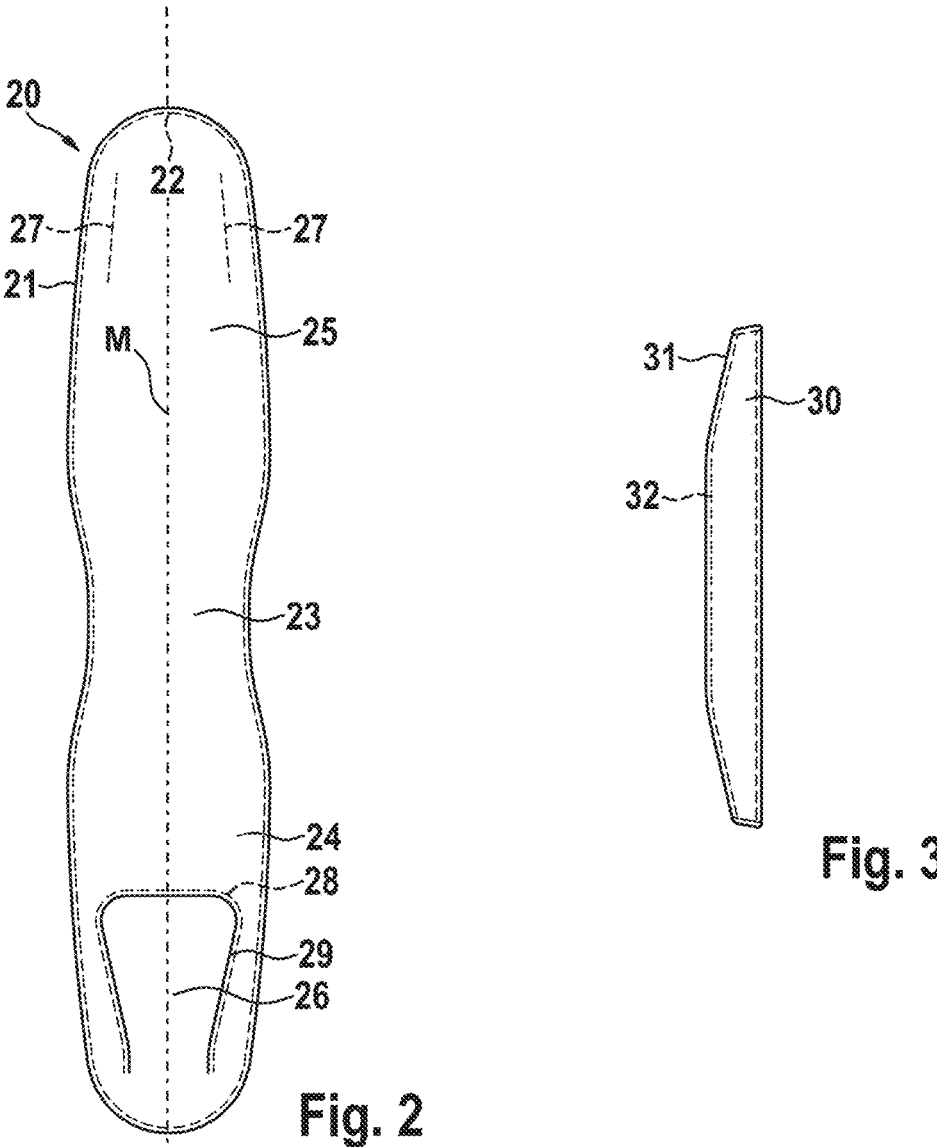
Fig. 2
Fig. 3

AIRBAG FOR A DRIVER'S SEAT OF A VEHICLE AND AIRBAG MODULE, VEHICLE OCCUPANT SAFETY SYSTEM AND VEHICLE HAVING SUCH AN AIRBAG

RELATED APPLICATIONS

This application is a U.S. National Stage Application filed under 35 USC 371, claiming priority to Serial No. PCT/EP2023/053455, filed on 13 Feb. 2023; which claims priority from European Patent Application 22156660.7, filed 14 Feb. 2022, the entireties of which are hereby incorporated herein by reference.

TECHNICAL FIELD

The invention relates to an airbag for a driver seat of a, specifically multi-track, vehicle. The invention further relates to an airbag module, a vehicle occupant safety system and a vehicle comprising such an airbag.

BACKGROUND

For the protection of vehicle occupants in the event of an accident or a collision, for many years airbags including a gas bag that deploys automatically in front of the vehicle occupants during collision have been used. Accordingly, a distinction is made between driver-side and passenger-side airbags. Passenger-side airbags are usually disposed in the instrument panel and, compared to driver-side airbags disposed in the steering wheel, have a larger airbag volume. Therefore, they have a larger restraining surface and, thus, offer comparatively better protection. The arrangement of airbags in the instrument panel which provides sufficient space for such a passenger airbag is impeded for driver-side airbags. Nevertheless, it is aimed to improve the protective effect of driver-side airbags. In so doing, considerations are made to position airbags in the instrument panel also on the driver side. It is a problem that a steering wheel disposed in front of the instrument panel can obstruct deployment of such a driver-side airbag. Equally, in passenger-side airbags large displays or large screens which serve for entertainment of the vehicle occupant, for example, can obstruct deployment of a known passenger airbag.

SUMMARY

With this in mind, it is the object of the invention to state an airbag for the driver seat of a, specifically multi-track, vehicle having an improved protective effect, the latter being geared to the functioning of a passenger airbag. It is a further object of the invention to state an airbag module, a vehicle occupant safety system as well as a vehicle comprising such an airbag.

In accordance with the invention, this object is achieved with respect to the airbag by the subject matters of the claims. With respect to the airbag module, the vehicle occupant safety system and the vehicle, the afore-mentioned object is achieved by the subject matters of the claims.

Concretely, the invention is based on the idea to state an airbag for a driver seat of a, specifically multi-track, vehicle, the airbag having a lateral fabric panel and a main fabric panel. The edges of the lateral fabric panel and the main fabric panel are sewn up to each other so that an airbag volume is formed. The lateral fabric panel includes two wing portions each forming a sidewall of the airbag, and a central portion connecting the wing portions. The main fabric panel includes an upper portion and a lower portion which are sewn up with the wing portions and are interconnected by a front portion, wherein a flap having an additional fabric strip or a gathering seam is additionally provided in the lower portion of the main fabric panel. At least one tether extending across the airbag volume is connected, on the one hand, to the upper portion and, on the other hand, to the flap of the gathering seam to form, in the filled state of the airbag, a concavity for bypassing a constraining contour.

The airbag according to the invention has a simple structure, with the airbag volume being substantially formed by the lateral fabric panel and the main fabric panel. Each of the wing portions of the lateral fabric panel forms, in the filled state of the airbag, a sidewall of the airbag. The central portion of the lateral fabric panel can be arranged substantially in the area of an instrument panel and preferably accommodates or is in fluid communication with a gas generator to fill the airbag with gas starting from the central portion of the lateral fabric panel.

The main fabric panel is preferably sewn up with the lateral fabric panel so that the main fabric panel with each of its upper and lower portions forms an upper side and a lower side of the filled airbag. The front portion of the main fabric panel connecting the upper portion to the lower portion preferably constitutes a front surface of the filled airbag. The front portion thus faces preferably the vehicle occupant, in particular a driver. Each of the upper portion and the lower portion of the main fabric panel is sewn up with one of the wing portions of the lateral fabric panel. This applies particularly to the outer edges of the portions which are preferably sewn up with each other such that the airbag volume is formed.

The airbag described here is particularly suited for the arrangement inside an instrument panel in the area of a driver seat of a vehicle. The concavity provided in the airbag according to the invention in the filled state of the airbag helps advantageously achieve that the airbag can span around a steering wheel and, in so doing, bypass the steering wheel as constraining contour. Hence, the airbag can deploy unhindered. By the airbag bypassing the constraining contour, in particular a steering wheel, another advantage is offered. The airbag can be placed, due to the concavity, over a steering wheel and bear against the same, if a vehicle occupant immerses into the filled airbag. When the airbag encompasses the constraining contour also laterally, moreover a guiding of the airbag in the filled state is achieved, resulting in high stability of the airbag. As an alternative, the airbag can be arranged inside an instrument panel in the area of a passenger seat of a vehicle, and the concavity provided in the airbag in the filled state of the airbag can help advantageously achieve that the airbag can span around a display and, in so doing, bypass the display as constraining contour.

In a preferred embodiment of the airbag according to the invention, the tether is provided to be dimensioned so that, when filling the airbag with a gas, the space between the upper portion and the lower portion of the main fabric panel is limited/defined. The part of the airbag delimited in this way substantially forms a bridging portion of the filled airbag which surrounds and, resp., bridges the constraining contour. Accordingly, the delimitation provided by the tether can be dimensioned so that a part of the airbag, in particular a portion of the main fabric panel, is pulled in the direction of the upper portion so that the bridging portion bulges over the constraining contour. The bridging portion then can merge into an effective portion which primarily cushions a vehicle occupant.

The additional fabric strip may be provided to be connected to the lower portion so that the flap and the lower fabric strip extend in a crease-free state in different planes. The flap can be formed specifically by a profiled cut or slit extending across the lower portion of the main fabric panel. Concretely, the flap may be delimited by a substantially U-shaped slit in the lower portion of the main fabric panel the slit edges of which being connected to the additional fabric strip. In this way, a geometrically predefined concavity is provided.

Alternatively, or additionally, the main fabric panel may be provided to be connected to an attachment fabric panel in the lower portion by means of the gathering seam. In this embodiment of the invention, consequently the main fabric panel is split, with a smaller part of the main fabric panel being formed by the attachment fabric panel. The attachment fabric panel is separately produced or, resp., cut out of a fabric panel and is preferably connected to the main fabric panel by means of a gathering seam. The gathering seam specifically tightens the fabric of the main fabric panel so that the concavity forms when the airbag is filled.

It is particularly preferred when the constraining contour is a steering wheel, wherein the concavity is configured so that the airbag in the filled state extends laterally around the steering wheel and over a front face of the steering wheel. The lateral extension around the steering wheel ensures, on the one hand, that the expansion of the airbag is not significantly impaired by the steering wheel. On the other hand, the lateral encompassing of the steering wheel serves for guiding the airbag and, consequently, for the stability thereof. As the airbag extends over the front face of the steering wheel, efficient protection for the driver of a vehicle is attained. The airbag can bear against the front face of the steering wheel and, insofar, is relatively stable.

In another embodiment of the invention, an additional tether extends from the central portion of the lateral fabric panel to the front portion of the main fabric panel. The additional tether delimits, when the airbag is filled, a space between the central portion of the lateral fabric panel and the front portion of the main fabric panel so that, in the filled state of the airbag, a lateral extension projecting from the front portion is formed. In modern vehicles, in addition to front airbags, also side window airbags are used to protect vehicle occupants. In particular crash situations, such as an oblique crash, there is the risk, however, of a head of a vehicle occupant in a crash getting caught in a gap between the side window airbag and the front airbag so that neither the side window airbag nor the front airbag can have its full protective effect. The afore-described lateral extension helps close said gap between the airbag and a side window airbag so that the protective effect of the airbag is significantly increased and, thus, in an oblique crash situation in particular the vehicle occupant can be protected from directly contacting the A-pillar of the vehicle.

An independent aspect of the invention relates to an airbag of a multi-track vehicle which includes an instrument panel and a steering wheel disposed in front of the instrument panel. Said airbag comprises a bridging portion which, in the filled state of the airbag, extends out of the instrument panel and over the steering wheel. Furthermore, said airbag has an effective portion which, in the filled state of the airbag, spans in front of the steering wheel. The airbag may include at least in the effective portion a rear concavity which accommodates the steering wheel in the filled state of the airbag. As an alternative to the steering wheel, the bridging portion of the airbag can extend out of the instrument panel and over a display arranged in front of the instrument panel and, resp., at the front edge of the instrument panel.

The description of said airbag within the scope of the present application generally refers to the geometric shape thereof in the completely filled state. The invention advantageously provides that the airbag deploying out of the instrument panel bulges around the steering wheel by means of the bridging portion and covers the steering wheel and, resp., the front face thereof by the effective portion. In this way, the airbag can deploy properly and safely around the steering wheel as constraining contour and provides a particularly large restraint gas volume to properly cushion a driver being positioned in front of the steering wheel. The effective portion covers the steering wheel preferably completely to prevent the vehicle occupant from directly impacting on the steering wheel.

In a preferred embodiment of the airbag, in the bridging portion at least one tether is provided which delimits the deployment of the bridging portion to form the rear concavity. The tether is preferably made of a fabric material, in particular of the fabric material that is also used for the airbag. Hence, in the unused state of the airbag, the tether is completely folded into the airbag, but when the airbag is filled, it ensures that opposite fabric panel portions of the airbag cannot arbitrarily move apart but are held in a predetermined shape. In this way, the deployment of the bridging portion is limited, with the limitation being preferably configured so that the bridging portion can extend between a windscreen and a steering wheel rim.

The steering wheel itself is preferably free from an airbag in this airbag design. The currently described airbag of a vehicle substantially replaces the common steering wheel airbag. This offers further advantages, in particular regarding the freedom of designing steering wheels.

A lateral extension is further preferred to be provided at the airbag, which closes, in the filled state of the airbag, a gap between the effective portion and a side window airbag. The lateral extension can be connected specifically to the effective portion. Preferably, the lateral extension is formed by an additional tether delimiting the deployment of the effective portion at least in portions being arranged inside the effective portion. The part of the effective portion that is not delimited as to its deployment by the tether then can form the lateral extension which extends beyond the delimited part of the effective portion and, thus, closes the gap to the side window airbag.

Another independent aspect of the invention relates to an airbag module for mounting in an instrument panel, particularly behind a steering wheel or a display, comprising an afore-described airbag and a gas generator connected to the airbag in a fluid-tight manner. The connection of the gas generator to the airbag is made, for example, via the central portion of the lateral fabric panel. Concretely, in the central portion of the lateral fabric layer an opening may be provided which is connected or tied to the gas generator. In this way, the filling of the airbag with gas from the gas generator is ensured to be centrally effectuated.

Within the scope of the present application, moreover a vehicle occupant safety system comprising an above-described airbag or airbag module is disclosed and claimed. Also, the present invention relates to a vehicle comprising an above-described airbag, an above-described airbag module and/or an above-outlined vehicle occupant safety system.

BRIEF DESCRIPTION OF THE DRAWINGS

In the following, the invention shall be illustrated in detail based on embodiments with reference to the attached schematic drawings, wherein FIG. 1 shows a lateral fabric panel of an airbag according to the invention of a preferred embodiment;

FIG. 2 shows a main fabric panel of an airbag according to the invention for being combined with the lateral fabric panel according to FIG. 1 of a preferred embodiment;

FIG. 3 shows an additional fabric strip for forming the concavity in an airbag according to the invention of a preferred embodiment, wherein the fabric strip can be combined specifically with the lateral fabric panel according to FIG. 1 and the main fabric panel according to FIG. 2;

DESCRIPTION

Figure 4:
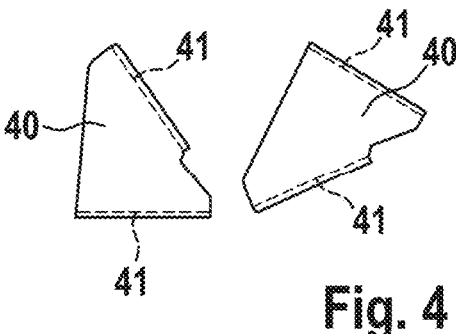
FIG. 4 shows two tethers for an airbag according to the invention of a preferred embodiment.

In FIGS. 1 to 4, different parts of an airbag 100 for a driver seat of a vehicle are shown which in their combination, specifically in the joined state, together form the airbag 100. Concretely, FIG. 1 illustrates a lateral fabric panel 10 of the airbag 100. The lateral fabric panel 10 has an outer edge 11 at which a peripheral seam 12 of the lateral fabric panel 10 is configured. The lateral fabric panel 10 includes a central portion 14 to both sides of which a wing portion 13 is connected. The lateral fabric panel 10 is preferably formed integrally of a uniform textile material.

The central portion 14 of the lateral fabric panel 10 preferably accommodates, in the mounted state of the lateral fabric panel 10 as part of the airbag 100, a gas generator and, hence, forms the inflation mouth and thus the area into which the gas from the gas generator flows first. The wing portions 13 constitute the sidewalls of the airbag 100.

FIG. 2 illustrates a main fabric panel 20 of the airbag 100, wherein the main fabric panel 20 includes an outer edge 21 which also comprises a peripheral seam 22 of the main fabric panel 20. The peripheral seam 22 of the main fabric panel 20 is preferably connected to the peripheral seam 12 of the lateral fabric panel 10 and, resp., substantially forms a uniform seam. The main fabric panel includes a front portion 23 connected to a lower portion 24 and an upper portion 25. The main fabric panel 20, particularly the front portion 23, the lower portion 24 and the upper portion 25 thereof, is substantially formed integrally of a uniform textile material.

The front portion 23 preferably faces the central portion 14 of the lateral fabric panel 10, when the airbag 100 is formed by joining the lateral fabric panel 10 and the main fabric panel 20. Hence, the front portion 23 of the main fabric panel 20 in the joined state forms, as part of the airbag 100, the front airbag surface of the latter. The front airbag surface is preferably the surface that is contacted first by a vehicle occupant in the event of collision. Concretely, a vehicle occupant immerses preferably into the front surface of the airbag 100, viz. the front portion 23 of the main fabric panel 20.

The lower portion 24 and the upper portion 25 extend over a lower side of the airbag 100 and, resp., an upper side of the airbag 100, wherein the ends thereof are preferably sewn up with the central portion 14 of the lateral fabric panel 10. Accordingly, the ends of the wing portions 13 of the lateral fabric panel 10 are preferably sewn up with the front portion 23 of the main fabric panel 20.

The main fabric panel 20 further includes a flap 26 formed in the lower portion 24. The flap 26 may be configured so that the lower portion 24 of the main fabric panel 20 has a slit 29 and, consequently, the main fabric panel 20 is slotted in regions. In FIG. 2, the slit 29 of the flap 26 is substantially U-shaped having a slightly trapezoidal contour.

In the upper portion 25, the main fabric panel 20 has two tether seams 27. The tether seams 27 extend substantially in the longitudinal direction of the main fabric panel 20 and are largely in parallel to their close peripheral seams 22 of the main fabric panel 20.

FIG. 3 shows another part of the airbag 100, which in this case is a fabric strip 30. The fabric strip 30 also has an outer edge 31 along which a peripheral seam 32 of the fabric strip 30 extends. The length of the fabric strip 30 preferably corresponds to the length of the slit 29 in the lower portion of the main fabric strip 20 delimiting and/or forming the flap 26. The peripheral seam 32 of the fabric strip 30 is preferably connected to a flap seam 28, on the one hand, and to a further seam of the main fabric panel 20. The flap seam 28 extends along the slit 29 formed by the flap 26. The flap seam 28 is arranged on the flap 26. In the lower portion 24 of the main fabric panel 20 preferably a further seam is provided which also extends along the slit 29 of the flap 26 but is associated with the fabric part of the lower portion 24 that does not belong to the flap 26.

The fabric strip 30 is preferably connected to both of said seams so that the flap 26 lifts off the lower portion 24 of the main fabric panel 20 but continues being connected to the lower portion 24 of the main fabric panel 20 via the fabric strip 30. In this way, a concavity 45 is formed in the lower portion 24 of the main fabric panel 20, said concavity enabling the airbag 100 to evade a constraining contour.

In order to achieve that the concavity 45 is actually formed when the airbag 100 is filled, additionally the tethers 40 whose pattern is shown in FIG. 4 are provided. The tethers 40 are formed of a fabric strip, with the tethers 40 including two peripheral seams 41. The peripheral seams 41 of each tether 40 are angled relative to each other, one peripheral seam 41 of the tether 40 being connected to a tether seam 27 of the upper portion 25 of the main fabric panel 20. The other peripheral seam 41 of the tether 40 is preferably connected to the flap 26. In this way, when the airbag 100 is filled, the flap 26 is ensured to be pulled toward the upper portion 25 of the main fabric panel 20 so that the concavity 45 is formed. In other words, the tether 40 prevents the flap 26 from bulging outward and, thus, helps to form a concavity 45.

Figure 6:
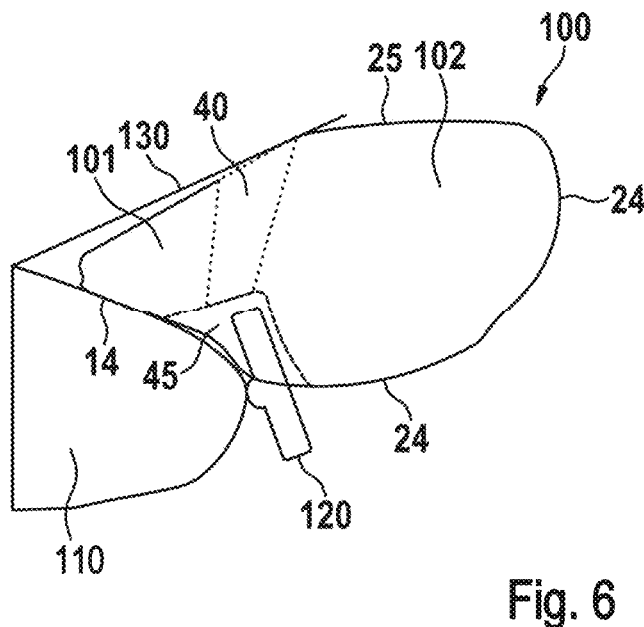
FIG. 6 shows a lateral view of an airbag according to the invention of a preferred embodiment.

This principle is clearly visible in FIG. 6. FIG. 6 illustrates a lateral view of an airbag 100, with the airbag 100 protruding from an instrument panel 110. The instrument panel 110 is mounted beneath a windscreen 130 and supports a steering wheel 120.

The airbag 100 comprises a bridging portion 101 and an effective portion 102. The bridging portion 101 and the effective portion 102 are formed jointly of the lateral fabric panel 10, the main fabric panel 20 and the tethers 40. The central portion 14 of the lateral fabric panel 10 is located in the bridging portion 101. The front portion 23 of the main fabric panel 20 is located in the effective portion 102.

The bridging portion 101 extends from the instrument panel 110 along the windscreen 130 to the steering wheel 120. The effective portion 102 in the filled state of the airbag 100 spans in front of the steering wheel 120. Thus, the effective portion 102 prevents a vehicle occupant from impacting on the steering wheel 120.

In the effective portion 102 the rear concavity 45 accommodating the steering wheel 120 is formed. In other words, the concavity 45 helps achieve that the airbag 100 can deploy around the steering wheel 120 without being prevented from deploying by the constraining contour of the steering wheel 120. The rear concavity 45 can extend into the bridging portion 101. Preferably, the concavity 45 is configured so that parts of the airbag 100 can also extend laterally around the steering wheel 120. Equally above the steering wheel 120, the airbag 100 can pass beyond the latter and span the effective portion 102 in front of the steering wheel 120 in this way. The bridging portion 101 extends insofar from the instrument panel 110 over the steering wheel 120.

FIG. 6 moreover indicates a tether 40 that extends across the bridging portion 101 and, specifically, connects the lower portion 24 of the main fabric panel 20 to the upper portion 25 of the main fabric panel 20. In this way, the tether 40 prevents the lower portion 24 of the main fabric panel 20 from bulging downward and hence from colliding with the steering wheel 120. Rather, the lower portion 24 and, resp., the flap 26 is/are pulled upward so that the bridging portion 101 can extend over the steering wheel 120.

The airbag 100 is preferably formed of a plurality of identical parts. In particular, the lateral fabric panel 10 may be a standard part that is commonly used for passenger airbags. Also, the main fabric panel 20 preferably is a standard part for passenger-side airbags 100 that is merely minimally modified for the present application to form the concavity 45 and, thus, to be able to use the airbag 100 also on a driver side of a vehicle.

Figure 5:
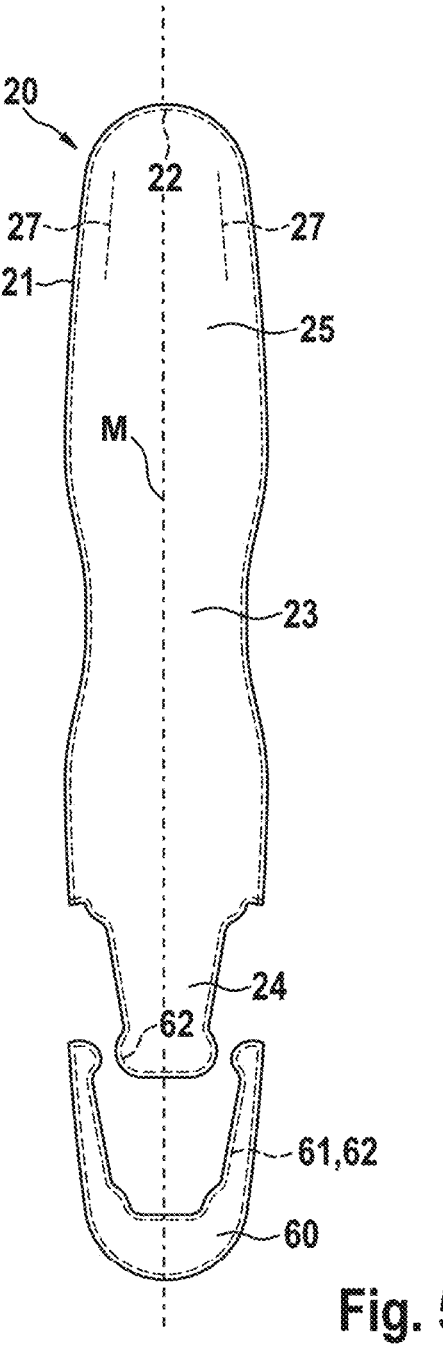
FIG. 5 shows a main fabric panel of an airbag according to the invention of another embodiment, wherein the main fabric panel can be combined with the lateral fabric panel according to FIG. 1.

FIG. 5 illustrates an alternative modification of a main fabric panel 20, which may replace the airbag parts according to FIGS. 2 and 3. The main fabric panel according to FIG. 5 is split and has an attachment fabric panel 60. The attachment fabric panel is connected to the lower portion 24 of the main fabric panel 20 by a contoured connecting seam 61. The connecting seam 61 is preferably structured such that the connecting seam 61 forms a gathering seam 62. The lower portion 24 of the main fabric panel 20 is gathered in portions so that in this way the concavity 45 is formed. A fabric strip 30 according to FIG. 3 is therefore not required. An airbag 100 formed by the main fabric panel 20 according to FIG. 5 preferably comprises a lateral fabric panel 10 according to FIG. 1 and tethers 40 according to FIG. 4, however.

Figure 7:
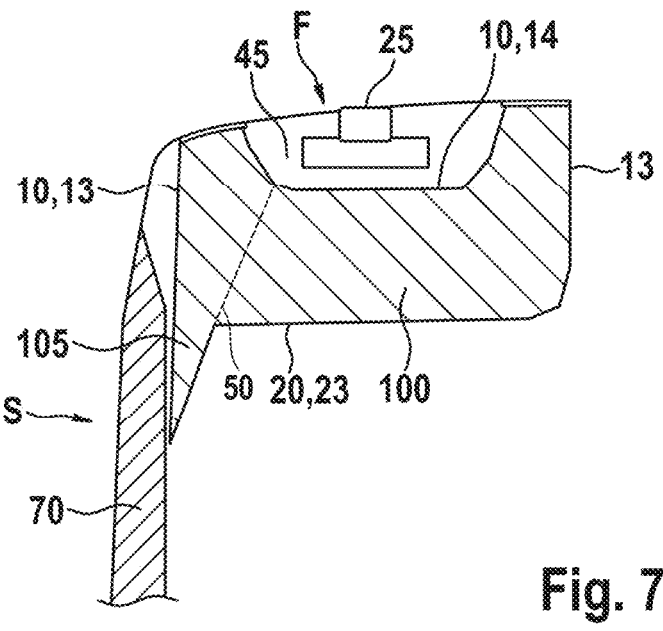
FIG. 7 shows a top view of an airbag according to the invention of another preferred embodiment.

FIG. 7 illustrates another modification of the airbag 100 which is provided in preferred embodiments. The airbag 100 comprises a bridging portion 101 and an effective portion 102, the effective portion 102 spanning in front of a steering wheel 120. The airbag 100 is embedded in a vehicle cabin having a front F and a side S. The airbag 100 extends preferably from the front F into the vehicle interior. From the side S, additionally a side window airbag 70 is provided which extends along the side S, in particular along a side window. With conventional airbags 100, there is the risk of a vehicle occupant slipping sideways when impacting on the airbag 100 and getting caught in a gap between the side window airbag 70 and the airbag 100.

In order to avoid this, the embodiment according to FIG. 7 provides that the airbag 100 includes another tether 50 that extends from the central portion 14 of the lateral fabric panel 10 to the front portion 23 of the main fabric panel 20. Moreover, the lateral fabric panel 10 and/or the main fabric panel 20 is/are configured to be asymmetric at least in portions in contrast to the embodiments of the FIGS. 1, 2 and 5. Accordingly, the lateral fabric panel 10 has in the wing portion 13 facing the side S and/or the main fabric panel 20 has in the portion facing the side S, specifically in the region of the front portion 23, excess fabric as compared to the opposite side with respect to a mirror axis M, so that a part of the airbag 100 facing the side window airbag 70 can be further filled. The tether 50 prevents the part of the airbag 100 that can be further filled from further bulging forward in the direction of the vehicle occupant such that a lateral extension 105 is formed which projects from the front portion 24 of the main fabric panel 20 and closes the gap between the airbag 100 and the side window airbag 70. The lateral extension 105 thus extends into the region of the side window airbag 70. In this way, the occupant safety in an automotive vehicle is further increased.

LIST OF REFERENCE SYMBOLS

10 lateral fabric panel
11 outer edge of the lateral fabric panel 10
12 peripheral seam of the lateral fabric panel 10
13 wing portion
14 central portion
20 main fabric panel
21 outer edge of the main fabric panel 20
22 peripheral seam of the main fabric panel 20
23 front portion
24 lower portion
25 upper portion
26 flap
27 tether seam
28 flap seam
29 slit
30 fabric strip
31 outer edge of the fabric strip 30
32 peripheral seam of the fabric strip 30
40 tether
41 peripheral seam of tether 40
45 concavity
50 further tether
60 attachment fabric panel
61 connecting seam
62 gathering seam
70 side window airbag
100 airbag
101 bridging portion
102 effective portion
105 lateral extension
110 instrument panel
120 steering wheel
130 windscreen
F front
S side
M mirror axis

The invention claimed is:

1. An airbag for a seat of a vehicle comprising a lateral fabric panel and a main fabric panel the edges of which are sewn up with each other so that an airbag volume is formed,
    wherein the lateral fabric panel includes two wing portions each forming a sidewall of the airbag, and a central portion connecting the wing portions,
    and wherein the main fabric panel includes an upper portion and a lower portion which are sewn up with the wing portions and are interconnected by a front portion, and in the lower portion at least one flap having an additional fabric strip is provided, and wherein at least one tether extending across the airbag volume is connected, on the one hand, to the upper portion and, on the other hand, to the at least one flap to form, in a filled state of the airbag, a concavity for bypassing a constraining contour.

2. The airbag according to claim 1, wherein the at least one tether is dimensioned so that, when filling the airbag with a gas, a space between the upper portion and the lower portion of the main fabric panel is defined.

3. The airbag according to claim 1, wherein the additional fabric strip is connected to the lower portion so that the at least one flap and the additional fabric strip extend in different planes in a wrinkle-free state.

4. The airbag according to claim 1, wherein the at least one flap is delimited by a substantially U-shaped slit in the lower portion of the main fabric panel, slit edges thereof being connected to the additional fabric strip.

5. The airbag according to claim 1, wherein the constraining contour is a steering wheel, wherein the concavity is configured so that the airbag in the filled state extends laterally around the steering wheel and over a front face of the steering wheel.

6. The airbag according to claim 1, wherein an additional tether extends from the central portion of the lateral fabric panel to the front portion of the main fabric panel, said additional tether delimiting, when the airbag is filled, a space between the central portion of the lateral fabric panel and the front portion of the main fabric panel so that, in the filled state of the airbag, a lateral extension projecting from the front portion is formed.

7. The airbag according to claim 1, wherein the airbag comprises a bridging portion that extends, in the filled state of the airbag, out of an instrument panel of the vehicle and over of a steering wheel positioned in front of the instrument panel, the airbag further comprising an effective portion that spans, in the filled state of the airbag, in front of the steering wheel, wherein the airbag at least in the effective portion has a rear concavity which, in the filled state of the airbag, accommodates the steering wheel.

8. A vehicle occupant safety system comprising the airbag according to claim 1.

9. A vehicle comprising vehicle occupant safety system according to claim 8.

10. An airbag for a seat of a vehicle comprising a lateral fabric panel, a main fabric panel, and an attachment panel, the edges of which are sewn up with each other so that an airbag volume is formed, wherein the lateral fabric panel includes two wing portions each forming a sidewall of the airbag, and a central portion connecting the wing portions, wherein the main fabric panel includes an upper portion and a lower portion interconnected by a front portion, wherein the attachment panel is connected to the lower portion of the main panel by a contoured connecting seam, wherein the upper portion, lower portion, and the attachment panel are sewn up with the wing portions, wherein at least one tether extending across the airbag volume is connected, on the one hand, to the upper portion and, on the other hand, to the attachment panel, wherein the contoured connecting seam is structured to form a gathering seam configured to gather the lower portion of the main panel to form, in a filled state of the airbag, a concavity for bypassing a constraining contour.

11. The airbag according to claim 10, wherein the at least one tether is dimensioned so that, when filling the airbag with a gas, a space between the upper portion and the lower portion of the main fabric panel is defined.

12. The airbag according to claim 10, wherein the constraining contour is a steering wheel, wherein the concavity is configured so that the airbag in the filled state extends laterally around the steering wheel and over a front face of the steering wheel.

13. The airbag according to claim 10, wherein an additional tether extends from the central portion of the lateral fabric panel to the front portion of the main fabric panel, said additional tether delimiting, in the filled state of the airbag, a space between the central portion of the lateral fabric panel and the front portion of the main fabric panel so that, in the filled state of the airbag, a lateral extension projecting from the front portion is formed.

14. The airbag according to claim 10, wherein the airbag comprises a bridging portion that extends, in the filled state of the airbag, out of an instrument panel of the vehicle and over a steering wheel positioned in front of the instrument panel, the airbag further comprising an effective portion that spans, in the filled state of the airbag, in front of the steering wheel, wherein the airbag at least in the effective portion has a rear concavity which, in the filled state of the airbag, accommodates the steering wheel.

* * * * *